United States Patent
Ricci et al.

[19]

[11] Patent Number: 5,881,618
[45] Date of Patent: Mar. 16, 1999

[54] TOOL BLOCK SLIDE ASSEMBLY FOR AUTOMATED CUTTING TOOL

[75] Inventors: Donato L. Ricci, W8477—162nd Ave., Hager, Wis. 54014; Brent Place, Red Wing, Minn.

[73] Assignee: Donato L. Ricci, Hager, Wis.

[21] Appl. No.: 66,024

[22] Filed: Apr. 24, 1998

[51] Int. Cl.[6] .................................. B23B 3/22; B23B 5/04
[52] U.S. Cl. .................................. 82/128; 82/70.2; 82/73; 82/83; 82/113; 82/131; 82/132
[58] Field of Search ............................. 82/70.2, 83, 112, 82/113, 128, 130, 131, 132, 73, 100

[56] References Cited

U.S. PATENT DOCUMENTS

| | | | |
|---|---|---|---|
| 4,130,034 | 12/1978 | Benoit | 82/113 |
| 4,397,202 | 8/1983 | Mayfield et al. | 82/128 |
| 4,739,685 | 4/1988 | Ricci | |
| 4,813,314 | 3/1989 | Kwech | 82/113 |
| 4,944,205 | 7/1990 | Ricci | 82/113 |
| 5,189,933 | 3/1993 | Ricci | 82/113 |
| 5,549,024 | 8/1996 | Ricci | |
| 5,605,083 | 2/1997 | Lupke et al. | 82/113 |

*Primary Examiner*—Andrea L. Pitts
*Assistant Examiner*—Toan Le
*Attorney, Agent, or Firm*—Nikolai, Mersereau & Dietz, P.A.

[57] ABSTRACT

A shield slide mechanism for moving the cutting tool of a clamshell lathe is provided. By shielding the mechanism, metal chips created during the cutting process are precluded from jamming the mechanism and preventing the controlled movement of the cutting tool. The tool block slide assembly incorporates a cam lever actuated feed screw operating through a unidirectional roller clutch rather than a conventional star wheel to provide a more controlled movement of the tool block slide.

9 Claims, 4 Drawing Sheets

TOOL BLOCK SLIDE ASSEMBLY FOR AUTOMATED CUTTING TOOL

BACKGROUND OF THE INVENTION

I. Field of the Invention

This invention relates generally to a machining lathe. More specifically, this invention relates to an improved tool block slide assembly for clamshell pipe and shaft machining lathes that is particularly designed to shield the moving parts thereof from metal chips being removed from the workpieces that might otherwise jam the slide mechanism.

II. Description of the Prior Art

The general concept of automated clamshell-type lathes is well known in the art. One such lathe is shown and described in U.S. Pat. No. 5,549,024 that was granted to the present applicant. Various advantages of that machining lathe over earlier lathes are outlined in that patent's specification.

Lathes of the type described in the above-referenced patent are often used in environments, such as in a nuclear power plant, where it is of utmost importance to minimize the amount of time that an operator is at the jobsite. By minimizing the amount of time, the amount of radiation that the operator receives is reduced. If the goal is to reduce the amount of exposure to radiation, it is then imperative that the machining lathe for cutting and/or refurbishing pipes and pipe flanges be designed and built so that the chance of any breakdown of the lathe equipment is minimized. Any breakdown of the equipment requiring operator repair or replacement increases the amount of radiation to which the operator is exposed.

While clamshell-type machining lathes such as described in the above-cited Ricci '024 patent are highly effective in reducing the amount of time that the operator is on the jobsite, the possibility exists that chips of metal being machined can find their way into the tool block slide assembly and thus interfere with movement of the tool block slide that clamps and holds the carbide-tipped cutting tool. Moreover, the mechanism for imparting rotation to the feed screw in the device described in the Ricci '024 patent comprises a starwheel drive. As the tool bit slide assembly that is mounted on the rotatable ring of the clamshell lathe orbits the workpiece, a tooth on the starwheel engages a stationary pin and imparts rotation to the feed screw on which the starwheel is mounted. It has been found from experience that such starwheel drives are somewhat prone to frequent failure and also that the depth of cut varies somewhat, leaving the surface being machined slightly irregular.

The present invention addresses these problems associated with prior art clamshell machining lathes and provides a new and improved tool block slide assembly. The new slide assembly offers a unique arrangement which greatly reduces the possibility of particles milled from a workpiece finding their way into the tool block slide assembly where they could interfere with movement of the slide. Moreover, it is designed for longer service life, easier set-up and reduced variation in cutting depths, leaving a smoother machined surfaces on the workpieces involved by eliminating the star wheel tool block slide and replacing it with a cam lever actuated mechanism.

SUMMARY OF THE INVENTION

The tool block slide assembly of the present invention includes a stationary base plate to which is affixed a guide plate having a semi-circular recess or channel formed therein in which a feed screw resides. The tool slide block is slidably secured to the guide plate, so that the feed screw and other components used to impart a sliding motion to the guide plate become shielded from exposure to loose material generated during the cutting process. These components include a cam levered drive that cooperates through a one-way clutch with a lead screw and traveling nut. The traveling nut is attached to the tool slide block to impart linear motion to the tool slide block as the feed screw is rotated due to engagement of the cam lever drive with a stationary tripper mechanism. A rapid return of the tool block slide to its home position is provided for by incorporating a gear train between the feed screw and a shaft that can be rotated with a speed wrench.

BRIEF DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DETAILED DESCRIPTION OF THE PREFERRED EMBODIMENTS

Figure 1:
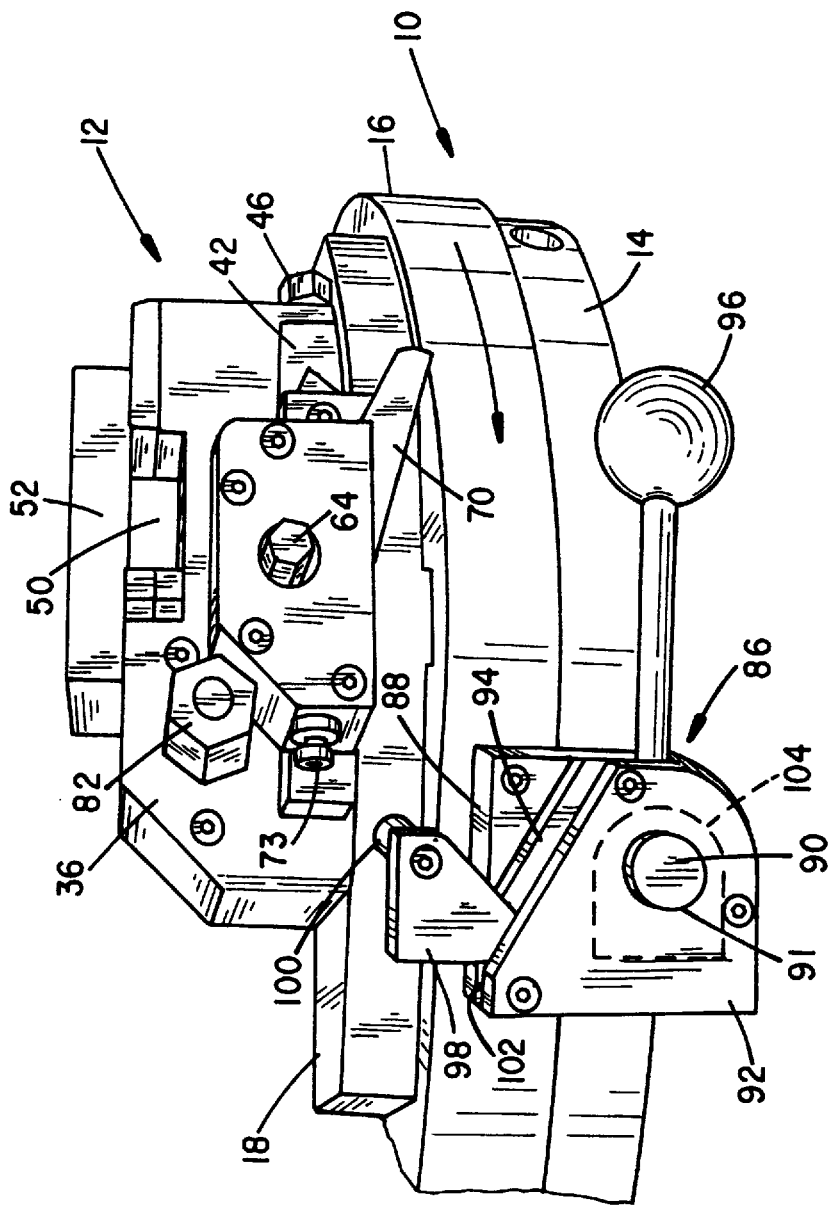
FIG. 1 is a partial perspective view of a clamshell machining lathe incorporating the improved slide block assembly of the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

The subject invention is ideally suited for use in conjunction with a clamshell lathe, a portion of which is indicated generally by numeral 10 in FIG. 1. A more detailed description of such a device is set forth in the aforereferenced Ricci U.S. Pat. No. 5,549,024, and the details thereof need not be repeated here. Those skilled in the art will recognize that the tool block slide assembly 12 shown mounted on the clamshell machining lathe can be used advantageously with other automated lathe designs. The purpose of describing the invention in conjunction with the clamshell lathe 10 is to demonstrate one preferred embodiment of the invention.

As is described in the Ricci '024 patent, the contents of which are hereby incorporated by reference, the lathe 10 includes a stationary ring member 14 which is adapted to be centered about and affixed to a cylindrical workpiece, such as large diameter pipes and shafts. The stationary ring supports a plurality of roller bearings (not shown) that cooperate with bearing races in the rotatable ring member 16. The ring member 16 further includes a ring gear at its periphery that is engaged by a mating gear on a drive motor so that the movable ring 16 can be made to rotate about the workpiece as an axis. The tool block slide assembly 12 is affixed to an outer surface of the rotatable ring gear 16 and, therefore, orbits the workpiece.

Figure 2:
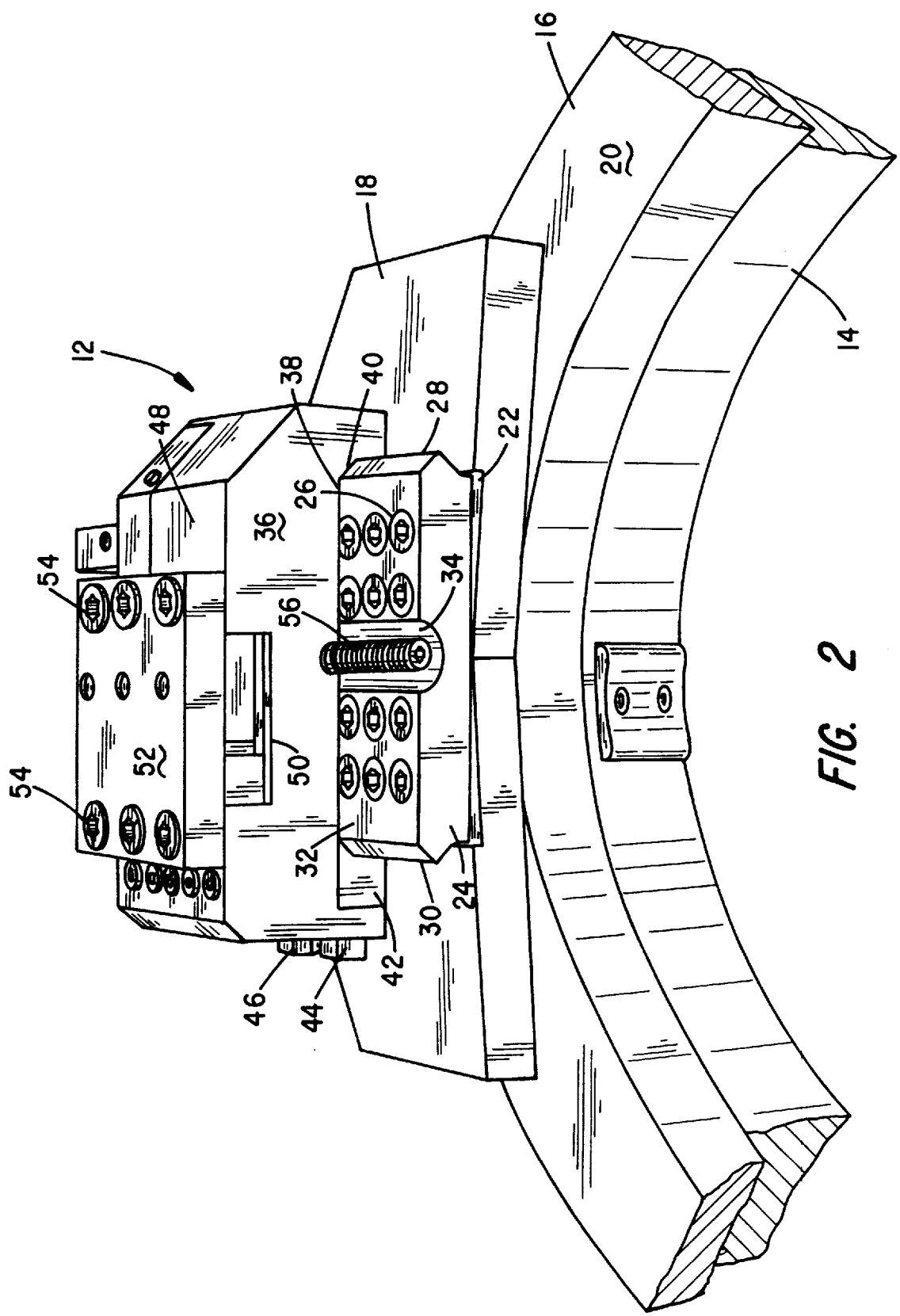
FIG. 2 is a further perspective view of the improved slide block assembly mounted on a clamshell lathe.

With reference to FIG. 2, the tool block slide assembly 12 is seen to comprise a base plate 18 that is clamped to the upper surface 20 of the rotatable ring 16. The base plate 18 includes a rectangular recess 22 into which is fitted a guide plate 24 that is held in place on the base plate by a plurality of bolts as at 26.

With continued reference to FIG. 2, it can be seen that the guide plate 24 includes first and second parallel, beveled, longitudinal side edges 28 and 30. Formed inwardly of a top surface 32 of the guide plate is a semicircular recess 34.

Mounted atop the guide plate 24 so as to straddle it is a tool slide block 36. More particularly, formed inwardly from the undersurface of the slide block 36 is a channel 38 comprising a guideway that has an angled slot 40 in one vertical side edge thereof for receiving the beveled longitudinal side edge 28 of the guide plate therein. Fitted into the channel or guideway 38 is an adjustable gib 42 that also has an angled notch in a vertical edge surface thereof for receiving the beveled longitudinal edge 30 of the guide plate. The adjustable gib 42 is held in place on the slide block 36 by means of bolts 44 and 46 and the gib is adjusted to permit free sliding action of the slide block 36 on the guide plate 24.

Formed inward form the top surface 48 of the slide block 36 is a channel 50 into which may be fitted a metal cutting tool (not shown). The tool itself is clamped in place by means of a cover plate 52 that is bolted to the slide block by bolts as at 54.

Figure 4:
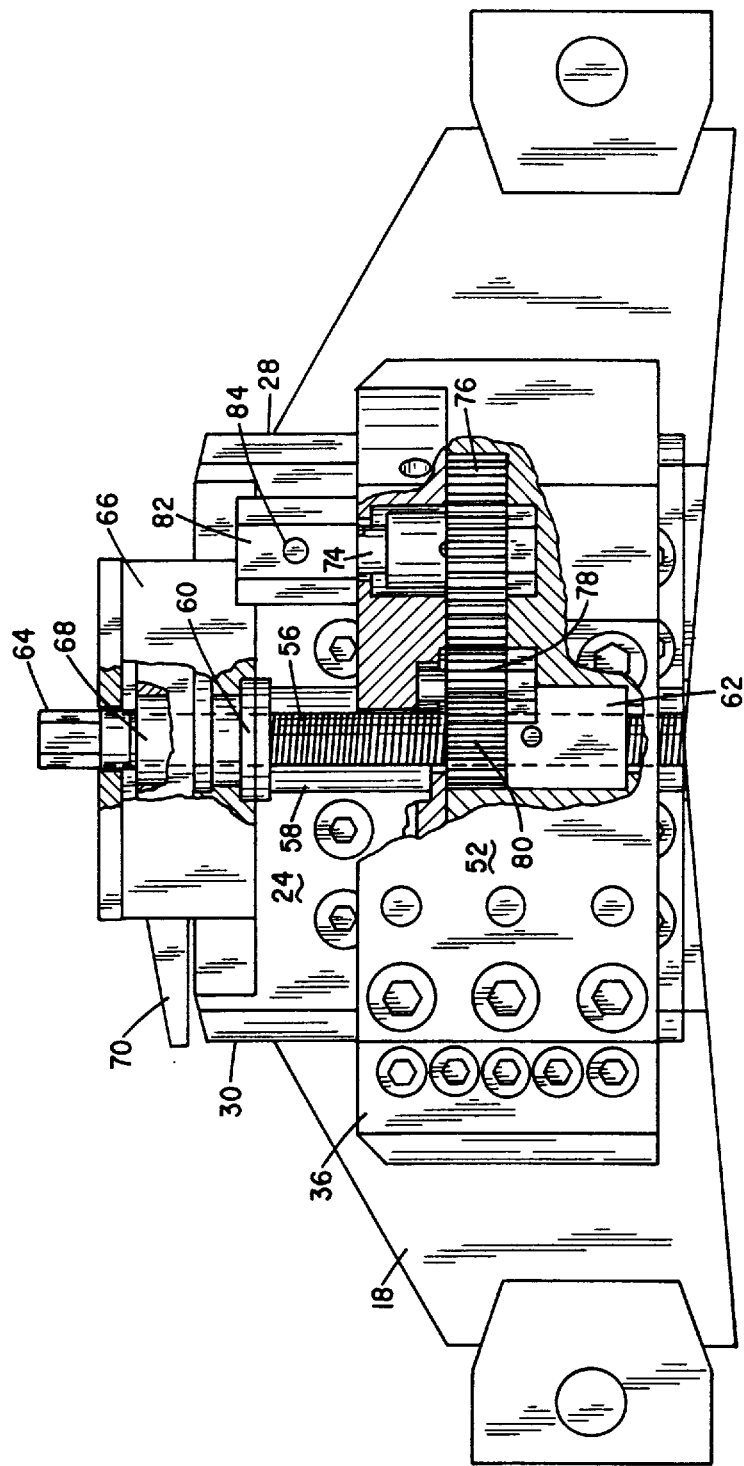
FIG. 4 is a top elevational view of the improved slide block assembly, partially broken away to show internal working parts.

Turning next to FIG. 4, it can be seen that a feed screw 56 is journaled for rotation in a longitudinal bore 58 formed through the tool slide block 24. Specifically, a feed screw retaining bushing 60 centers the feed screw 56 within the bore 58. Threaded onto the feed screw 56 is a traveling feed nut 62 which fits into the bore 58 with a tight friction fit. The diameter of the feed nut 62 is such that it extends partially into the semicircular channel 34 (FIG. 2) formed inwardly of the top surface of the guide plate 24.

It is apparent from what has heretofore been described that when the feed screw 56 is rotated, the tool slide block will be translated along the guide plate in a direction dependent upon the direction of rotation of the feed screw.

Figure 3:
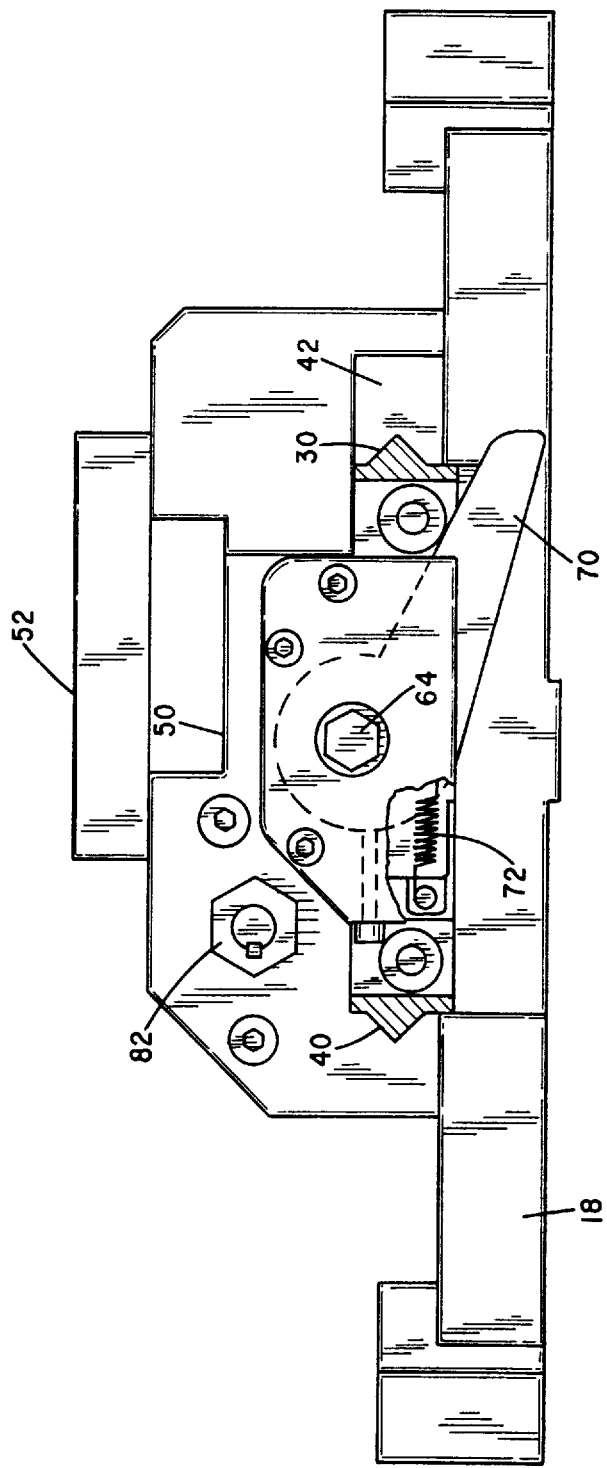
FIG. 3 is a front elevational view of the slide block assembly in accordance with the present invention.

With continued reference to FIG. 4, it will be noted that the outer end 64 of the feed screw has a hex nut configuration such that one can rapidly rotate the feed screw using a socket wrench. This allows an operator to rapidly position the cutting tool against the workpiece prior to actuation of the clamshell drive motor. Disposed inwardly on the feed screw and within the housing 66 is a one-way roller clutch 68 that is operatively used to couple a cam lever 70 to the feed screw 56. The roller clutch operates in a conventional fashion so that when the cam lever is rotated in a first direction, the torque will be applied through the clutch to the feed screw causing it to be rotated. However, when the cam lever returns to its original position, the clutch free-wheels and no torque is applied to the feed screw. Thus, with reference to FIG. 3, when the lever 70 is rotated in the counterclockwise direction, the feed screw 56 will be rotated so as to translate the tool slide block 36 toward the workpiece. When the cam lever is returned to its home position by the return spring 72, the clutch slips and does not impart a corresponding opposite rotation to the feed screw. An adjustment bolt 73 cooperates with cam lever 70 for setting the stroke of cam lever 70.

Referring once again to FIG. 4, a further shaft 74 is journaled for rotation in the tool slide block and mounted on the shaft 74 is a reversing spur gear 76. It engages a pinion gear 78 of a lesser diameter and which, in turn, meshes with a feed nut mounted spur gear 80. The shaft 74 has a hex nut fitting 82 secured to it by a fastening pin 84.

Referring back to FIG. 1, affixed to the stationary ring 14 of the clamshell machining lathe is a cam lever tripper assembly, indicated generally by numeral 86. It includes a mounting plate 88 that is bolted to the periphery of the stationary ring 14. Projecting outwardly from the mounting plate is a cylindrical mounting post 90 that passes through aligned bores 91, a pair of spaced-apart pivot plates 92 and 94. A handle 96 is coupled to the mounting plates 92 and 94 to facilitate rotation thereof about the pivot 90. The plates 92 and 94 can be slid along mounting post 90 to a desired position and locked in place by a set screw (not shown) to facilitate alignment with the cam lever at the time of set-up.

Adjustably mounted between the pivot plates 92 and 94 is a roller adjustment arm 98 that supports a cam roller 100 thereon. The roller adjustment arm has a slotted extension 102 through which clamping bolts (not shown) pass before entering threaded bores in a pivot mount 104. Hence, when the clamping bolts are loosened, the arm 98 can be raised and lowered in the space between the pivot plates 92 and 94 such that the roller will be at a desired elevation in the path of travel of the cam lever 70.

OPERATION

With the tripper mechanism 86 positioned as illustrated in FIG. 1, and with the rotatable ring 16 rotating in the direction indicated by the arrow thereon, the cam roller 100 extends into the path of the cam lever 70. On each revolution of the ring gear 16, the cam lever 70 will be engaged by the roller 100 causing the cam lever to be rotated in the counterclockwise direction to impart rotation to the feed screw 56 via the one-way clutch mechanism 68 (FIG. 4). The extent of angular rotation of the feed screw is determined by the height at which the cam roller on the tripper mechanism is elevated and by the setting of the fine adjustment screw 73. Hence, the extent of translation of the tool slide block 36 on each orbital revolution is also set by the height adjustment of the adjustment arm 98 on the tripper mechanism and by the setting of the adjustment screw 73.

Referring to FIG. 2, as the tool block 36 carrying the cutting tool (not shown) that projects outward from the tool slot 50 is initially brought into engagement the workpiece centered in the clamshell rings 14 and 16 by rotation of the hex head 64, when the clamshell drive motor (not shown) is energized to rotate the ring 16, the cutting tool will begin removing metal in small particles or chips from the workpiece. Because of the close tolerances between the guide plate 24 and the guideway 38 formed in the slide block, chips are prevented from finding their way between the mating surfaces of the guide plate and slide block. Chips falling into the semicircular groove or recess 34 are swept out of or cleared from that recess as the feed nut 62 that is centered on the feed screw 56 advances along the feed screw carrying the slide block with it.

At any time that the operator wishes to arrest further advancement of the cutting tool against the workpiece, he may throw the handle 96 downward from the position shown in FIG. 1 to thereby rotate the cam roller 100 on the trip mechanism out of the path of travel of the cam lever 70.

Furthermore, upon the completion of a cutting operation, the slide block may rapidly be returned to its home or start position by using a socket wrench to rotate the hex nut 82 which, as shown in FIG. 4, acts through the gear train comprising the gears 76, 78 and 80 to rapidly rotate the feed screw 56 in a direction to move the tool block away from the workpiece.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. An improved tool block slide assembly adapted for use with a clamshell lathe, the lathe having a stationary ring adapted to be clamped to a cylindrical workpiece and a rotatable ring journaled for rotation on the stationary ring, the tool block slide assembly comprising:
    (a) a base plate adapted to be affixed to the rotatable ring;
    (b) a guide plate attached to the base plate, the guide plate having a longitudinal channel formed therein a first and second, parallel beveled longitudinal side edges;
    (c) a slide block having a guideway formed in a bottom surface thereof for receiving the guide plate therein, the slide block adapted to support a cutting tool;
    (d) an internally threaded feed nut captured in the slide block and extending into the longitudinal channel of the guide plate;
    (e) a feed screw journaled for rotation in the slide block, the feed screw being externally threaded along a predetermined length thereof and cooperating with the threaded feed nut so that clockwise rotation of the feed screw causes the slide block to be displaced with respect to the guide plate in a first direction and counterclockwise rotation of the feed screw causes the slide block to be displaced with respect to the guide plate in an opposite direction; and
    (f) means for periodically rotating the feed screw.

2. The tool block slide assembly as in claim 1 wherein movement of the feed nut along the longitudinal channel sweeps cuttings from the channel.

3. The tool block slide assembly as in claim 1 wherein the slide block guideway has a first angled slot for receiving the first beveled side edge therein.

4. The tool block slide assembly as in claim 3 and further including an adjustable gib affixed to the slide block member, the gib having a second angled slot for receiving the second beveled side edge therein.

5. The tool block slide assembly as in claim 1 wherein the means for periodically rotating the feed screw comprises:
    (a) a tripper assembly affixed to the stationary ring of the clamshell lathe and having a cam lever engaging member extending radially outward therefrom; and
    (b) a cam lever coupled to the feed screw proximate an end thereof, the cam lever traveling in a path to engage the cam lever engaging member during a rotation of the rotatable ring relative to the stationary ring to thereby rotate the cam lever from a first position to a second position.

6. The tool block slide assembly as in claim 5 and further including a one-way roller clutch for coupling the cam lever to the feed screw.

7. The tool block slide assembly as in claim 6 and further including a return spring connected between the cam lever and the guide plate for returning the cam lever to the first position from the second position without corresponding rotation of the feed screw.

8. The tool block slide assembly as in claim 5 and further including means for manually repositioning the feed nut along the feed screw.

9. The tool block slide assembly as in claim 8 wherein the manual repositioning means comprises a manually rotatable shaft journaled for rotation in the slide block and a gear train coupling the manually rotatable shaft to the feed nut.

* * * * *